United States Patent
Rivers et al.

(10) Patent No.: US 6,948,051 B2
(45) Date of Patent: Sep. 20, 2005

(54) METHOD AND APPARATUS FOR REDUCING LOGIC ACTIVITY IN A MICROPROCESSOR USING REDUCED BIT WIDTH SLICES THAT ARE ENABLED OR DISABLED DEPENDING ON OPERATION WIDTH

(75) Inventors: Jude A. Rivers, Cortland Manor, NY (US); Jaime H. Moreno, Dobbs Ferry, NY (US); Vinodh R. Cuppu, Fairfax, VA (US)

(73) Assignee: International Business Machines Corporation, Armonk, NY (US)

( * ) Notice: Subject to any disclaimer, the term of this patent is extended or adjusted under 35 U.S.C. 154(b) by 522 days.

(21) Appl. No.: 09/855,241

(22) Filed: May 15, 2001

(65) Prior Publication Data

US 2002/0174319 A1 Nov. 21, 2002

(51) Int. Cl.$^7$ ............................................. G06F 9/318
(52) U.S. Cl. ...................................................... 712/200
(58) Field of Search ................................ 712/200, 207, 712/221, 223

(56) References Cited

U.S. PATENT DOCUMENTS

| | | | | |
|---|---|---|---|---|
| 4,442,498 A | * | 4/1984 | Rosen | 708/497 |
| 4,941,119 A | * | 7/1990 | Moline | 708/553 |
| 4,943,908 A | * | 7/1990 | Emma et al. | 712/240 |
| 5,010,511 A | * | 4/1991 | Hartley et al. | 708/707 |
| 6,192,384 B1 | * | 2/2001 | Dally et al. | 708/200 |

OTHER PUBLICATIONS

Ruby B. Lee; Efficiency of microSIMD architectures and index-mapped data for media processors; Media Processors 1999; Jan. 25–29, 1999; pp. 34–46.*

Jae–Woo Ahn and Wonyong Sung; Multimedia Processor–Based Implementation of an Error–Diffusion Halftoning Algorithm Exploiting Subword Parrallelism; Circuits and Systems for Video Technology; Feb. 2001; pp. 129–138.*
Ruby B. Lee; Multimedia Extensions for General–Purpose Processors; Signal Processing Systems, 1997; Nov. 3–5, 1997; pp. 9–23.*
John L Hennessy and David A Patterson; Computer Organization and Design The Hardware/Software Interface; Morgan Kaufman Publishers; 1998; pp. 221–223.*
David Brooks, et al.(1999)"Dynamically Exploiting Narrw Width Operands to Improve Processor Power and Performance", *IEEE* pp. 13–22; and.
Ramon Canal, et al. (2000) "Very Low Power Pipelines Using Significance Compression", *IEEE* pp. 181–190.

* cited by examiner

*Primary Examiner*—Eric Coleman
(74) *Attorney, Agent, or Firm*—Scully, Scott, Murphy & Presser; Robert M. Trepp, Esq.

(57) ABSTRACT

A method and apparatus for reducing logic activity in a microprocessor which examines every instruction before it is executed and determines in advance the minimum appropriate datapath width (in byte or half-word quantities) necessary to accurately execute the operation. Achieving this requires two major enhancements to a traditional microprocessor pipeline. First, extra logic (potentially an extra pipeline stage for determining an operation's effective bit width—the WD width detection logic) is introduced between the Decode and Execution stages. Second, the traditional Execution stage architecture (including a register file RF and the arithmetic logical unit ALU), instead of being organized as one continuous 32-bit unit, is organized as a collection of multiple slices, where a slice can be of an 8-bit (a byte) or a 16-bit (double byte) granularity. Each slice in this case can operate independently of each other slice, and includes portion of the register file, functional unit and cache memory. Concatenating a multiple number of these slices together creates a required full width processor.

20 Claims, 13 Drawing Sheets

$$F_{OVERFLOW} = X_A.X_B + Y_A.Y_B + X_A.Y_A + X_B.Y_A + Y_B.X_A$$

Fig. 9

METHOD AND APPARATUS FOR REDUCING LOGIC ACTIVITY IN A MICROPROCESSOR USING REDUCED BIT WIDTH SLICES THAT ARE ENABLED OR DISABLED DEPENDING ON OPERATION WIDTH

BACKGROUND OF THE INVENTION

1. Field of the Invention

The present invention relates generally to a method and apparatus for reducing logic activity in a microprocessor, and more particularly pertains to a method and apparatus for reducing logic activity in a microprocessor which leverages off the variations in effective bit-widths of operations in an application in controlling the total energy/power consumed during a workload execution. Energy or power consumed during a workload's execution in a microprocessor is partly due to the bit transitions or logic activity experienced in the course of processing. Hence, the larger the number of bits that have to transition during any one operation, the higher the activity levels and the likelihood of more energy being consumed.

2. Discussion of the Prior Art

The datapath for today's microprocessors is getting larger, particularly to cover very large memory address space. Currently, the 32-bit datapath is commonplace, and 64-bits is becoming more widespread. However, a closer look at the effective operation width in typical applications reveals that as much as 70% of instructions in some applications can be executed with an 8-bit wide functional unit. This means that the typical microprocessor today is unnecessarily executing longer operations, causing unnecessary bit transitions, and ultimately consuming more energy than is really necessary for accurate program execution.

SUMMARY OF THE INVENTION

Accordingly, it is a primary object of the present invention to provide a method and apparatus for reducing logic activity in a microprocessor which examines every instruction before it is executed and determines in advance the minimum appropriate datapath width (in byte or half-word quantities) necessary to accurately execute the operation.

Achieving this requires two major enhancements to a traditional microprocessor pipeline. First, extra logic (potentially an extra pipeline stage for determining an operation's effective bit width—the WD width determination logic) is introduced between the Decode and Execution stages. Second, the traditional Execution stage architecture (consisting of the register file RF and the arithmetic logical unit ALU), instead of being organized as one contiguous unit, is organized as a collection of multiple slices, where a slice can be of an 8-bit (a byte) or a 16-bit (double byte) granularity. Each slice in this case can operate independently of every other slice, and consists of a portion of the register file, functional unit and cache memory. Concatenating a multiple number of these slices together creates a required full width processor. These slices work either all in parallel when a full-width operation is executed, or only the lowermost slice(s) is (are) (minimum required number) enabled for the case of narrow-width operations. Slices are enabled on a cycle-by-cycle basis by the width determination logic using information on RF value widths and signs which are stored for each register value. The WD logic achieves the enablement of various slices through the use of clock gating.

The process of utilizing the minimum appropriate datapath bits per instruction execution enables a reduction in the logic activity of a processor so that dynamic power consumption can be reduced, with little or no performance degradation.

BRIEF DESCRIPTION OF THE DRAWINGS

The foregoing objects and advantages of the present invention for a method and apparatus for reducing logic activity in a microprocessor may be more readily understood by one skilled in the art with references being had to the following detailed description of several preferred embodiments thereof, taken in conjunction with the accompanying drawings wherein like elements are designated by similar related reference numerals throughout the several views in which:

FIG. 9 illustrates logic development for overflow detection in addition operations using 2-bit tags.

DETAILED DESCRIPTION OF THE DRAWINGS

Figure 1:
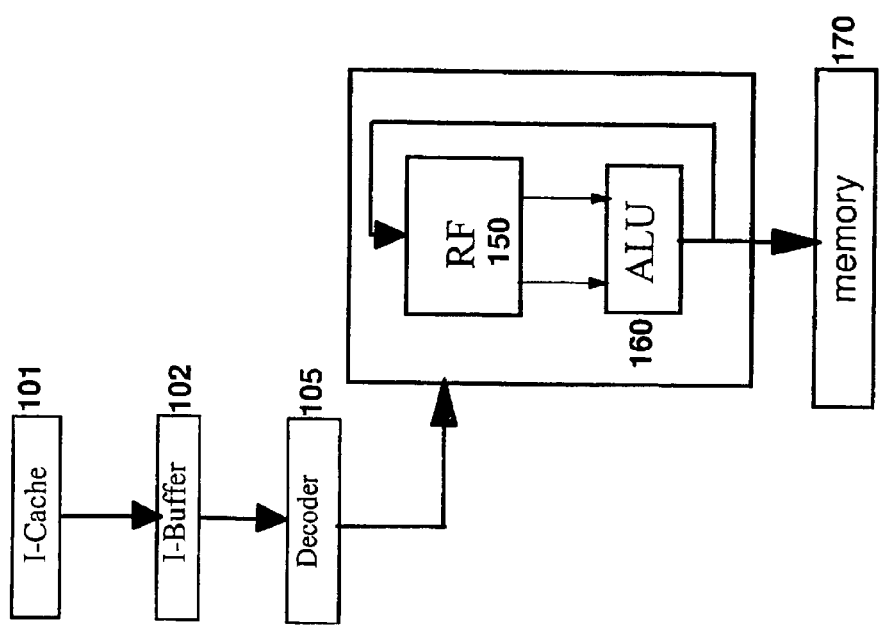
FIG. 1 is a block diagram of a simple multistage microprocessor pipeline structure for a traditional microprocessor design.

FIG. 1 is a block diagram of a simple multistage microprocessor pipeline structure for a traditional microprocessor design. To start an instruction execution, the instruction is first fetched from an instruction cache 101 and loaded into an instruction buffer 102. The instruction is then decoded by a decoder 105 for the operation, and the corresponding register values are read from a register file 150 and are input to an arithmetic logical unit 160 where the actual execution takes place, the output of which is stored back in a register file 150 and may be subsequently stored into a cache memory 170.

Figure 2:
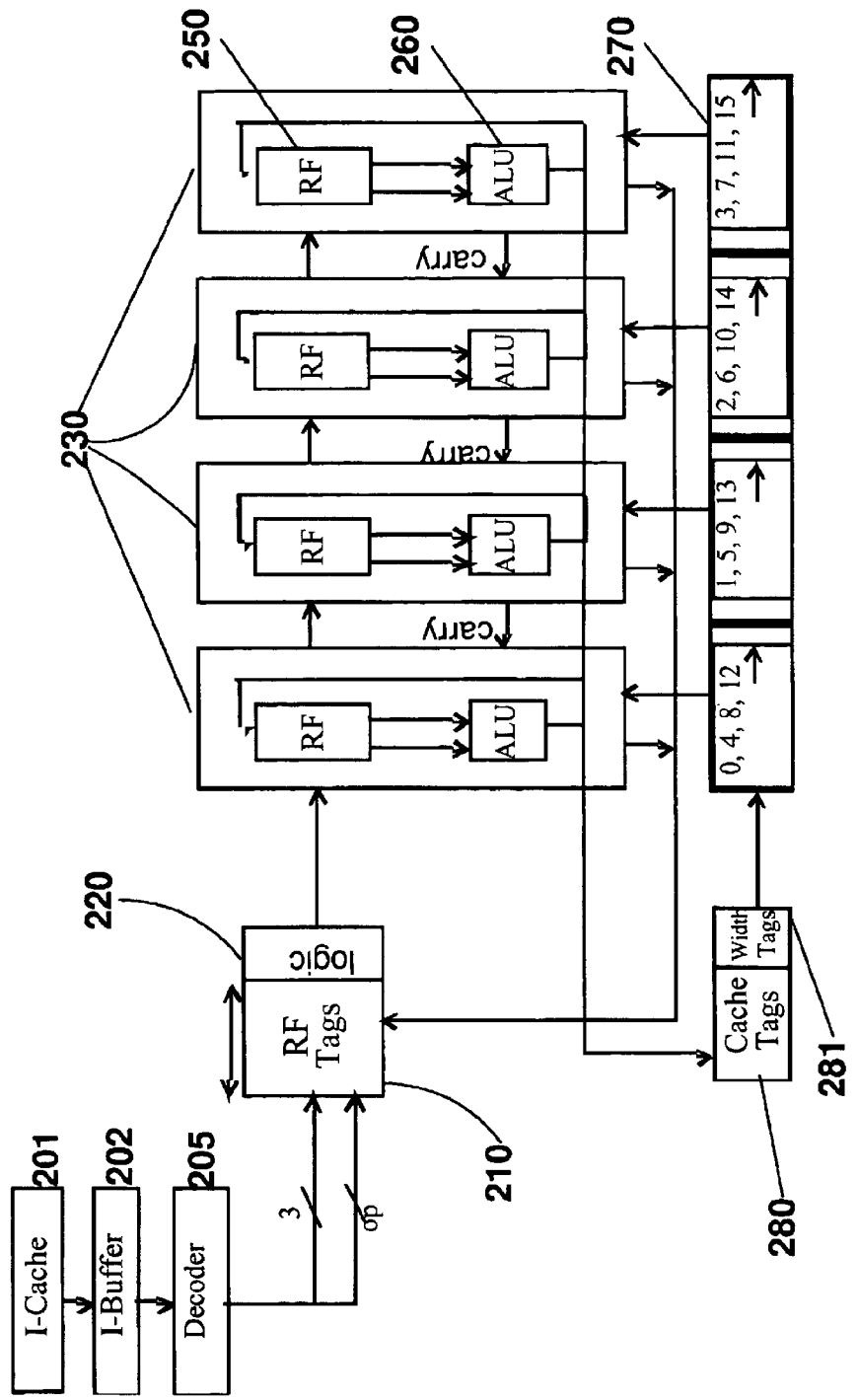
FIG. 2 is a block diagram of a microprocessor pipeline structure of the present invention incorporating width determination (WD) Logic and bit width slices consisting of 4 slices, where each slice is of 8-bit granularity.

FIG. 2 is a block diagram of a first embodiment of a microprocessor pipeline structure of the present invention having an instruction cache 201 and instruction buffer 202 similar to 101 and 102 as explained with references to FIG. 1, and incorporating width determination (WD) Logic 220 and bit width slices consisting of 4 slices 230, wherein a slice 230 is of 8-bit granularity. Each slice 230 consists of a portion of the register file RF 250, a portion of the ALU 260, and a portion of the cache memory 270. In FIG. 2, the lowermost or least significant slice is illustrated on the right, and the uppermost or most significant slice is illustrated on the left, with a data carry operation from a lesser significant slice to a more significant slice. The concatenation of these 4 slices 230 creates a full-width processor, as required by the processor architecture.

The slices shown here work either all in parallel when a full-width operation is executed, or only the lowermost slice(s) is (are) (minimum required number) enabled if the operation width is determined to be narrow. Slices are enabled on a cycle-by-cycle basis by the width detection (WD) logic 220 which uses information about the length of the operands kept in an RFtags module 210. The RFtags module 210 can be a table that stores value bit information (see 720 in FIG. 7 and the detailed explanation thereof) about all operands in the register file 250. This value bit information is referred to as bitmask, and is explained in detail with reference to FIG. 7. All sorts of value bit information may be kept for a register operand. In one embodiment illustrated at the bottom of FIG. 7, the bitmask keeps the sign in one bit, the register data width in bytes of the operand value in two bits, and the leading two bits of each of the first two bytes of the operand value.

The cache tags 280 comprise addresses of the cache memory to write to and to read from, and the width tags 281 comprise the width of data stored in each memory address.

In FIG. 2, control signals flow from the WD logic 220 directly to enable dataflow and computation in the slices 230 appropriately. Data layout in the cache 270 is organized as follows. A word of data consists of 4 bytes. In this cache data layout 270, a word is divided into a most significant byte 0 which resides in the first leftmost slice, see 270, a second and third lesser significant byte 1,2 which is entered into the respective second and third slices, and a least significant byte 3 which is entered into the right-most slice, and etc. for succeeding bytes, 4, 5 . . . 15 . . . n. Data overflow or carry proceeds from the least significant slice to the most significant slice.

The determination of the width of an operation is performed after the decoder stage 205 in the pipeline (as shown in FIG. 2), and suitable control bits are propagated with the data through the pipeline for enabling the various stages as needed. The output of the decoder 205 labeled 3 indicates two source and one destination registers, and the output of the decoder 205 labeled op indicates the instruction operation code (opcode). The process determines the appropriate width for an operation, and propagates this information down the pipe (from register/memory read through register write-back or cache memory store) (load data from cache memory to register if necessary, from register to ALU, perform ALU operation, transfer data from ALU to register, and finally store from register to cache memory) to reduce process logic activity.

The effective operation width is defined as the minimum datapath width actually required to perform an operation and achieve the correct result for the operation. This process may include the possible need to copy the upper portions of one of the operands into the result register or a sign extending the result of the operation into the upper portions of the result register when at least one of the operands for the operation is negative.

Figure 3:
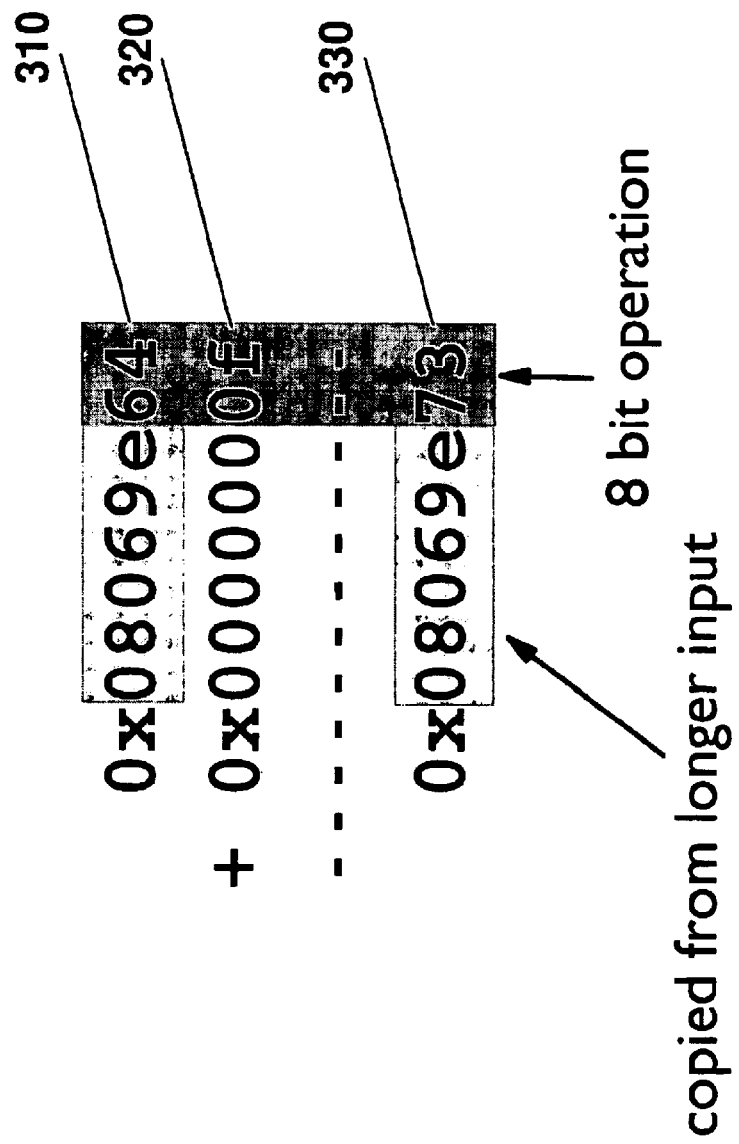
FIG. 3 illustrates an appropriate example of the definition of the effective operation width.

FIG. 3 illustrates an appropriate example of the definition of the effective operation width. This example adds 2 positive numbers of thirty two (32) bit length 310 and eight (8) bit length 320 respectively, shown in a hexadecimal format. By the definition, this operation can be correctly carried out by adding only the lower eight bits and copying the upper portion of the first operand into the result 330. Instead of a 32-bit operation therefor, only an 8-bit operation is performed.

Figure 4:
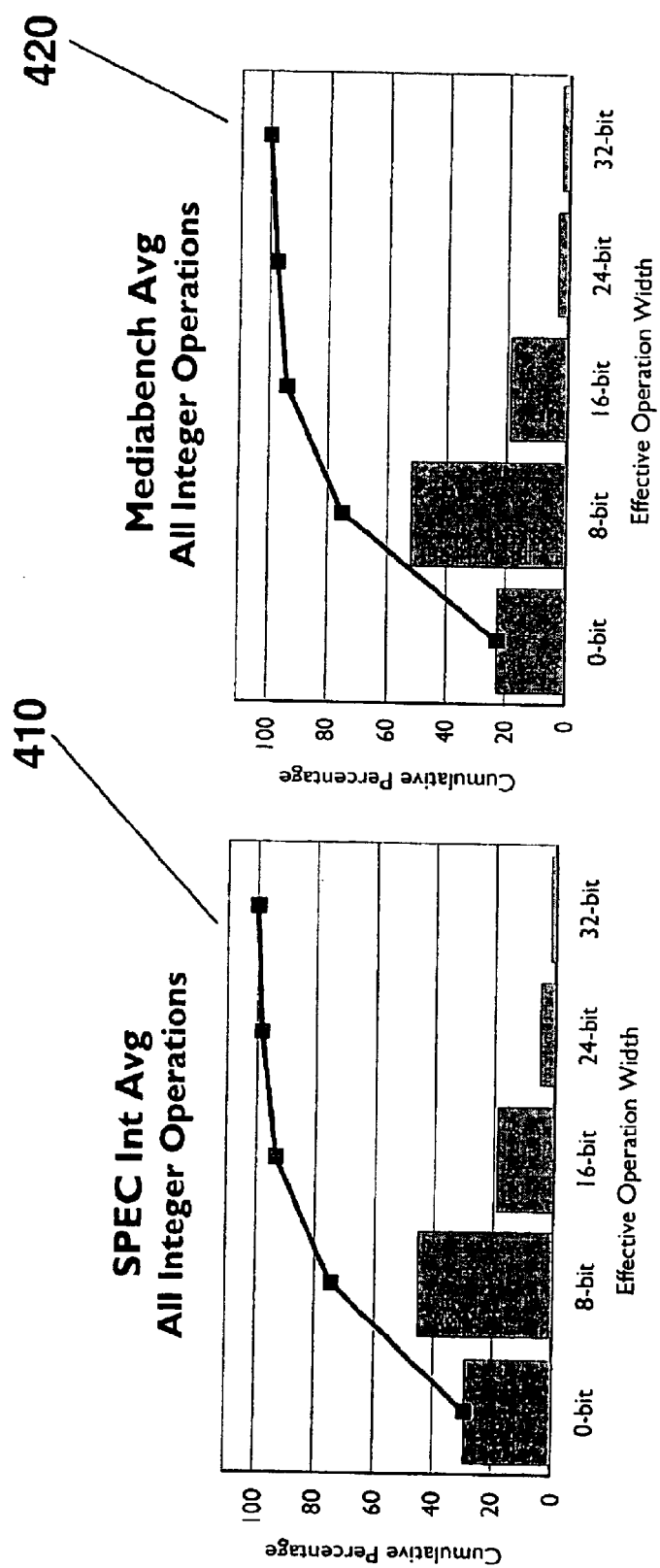
FIG. 4 illustrates graphs on the potential for varying bit-width computing, and illustrates the average operation width distributions of SPECInt2000 and Mediabench.

From the foregoing definition of the effective operation width, FIG. 4 illustrates graphs 410, 420 on the potential for varying bit-width computing, and illustrates the average operation width distributions of the SPECInt2000 and Mediabench. These graphs show that the average embedded application instruction is skewed in the direction of narrow width words, creating the impetus for narrow bit-width computing pursuant to the present invention.

Figure 5:
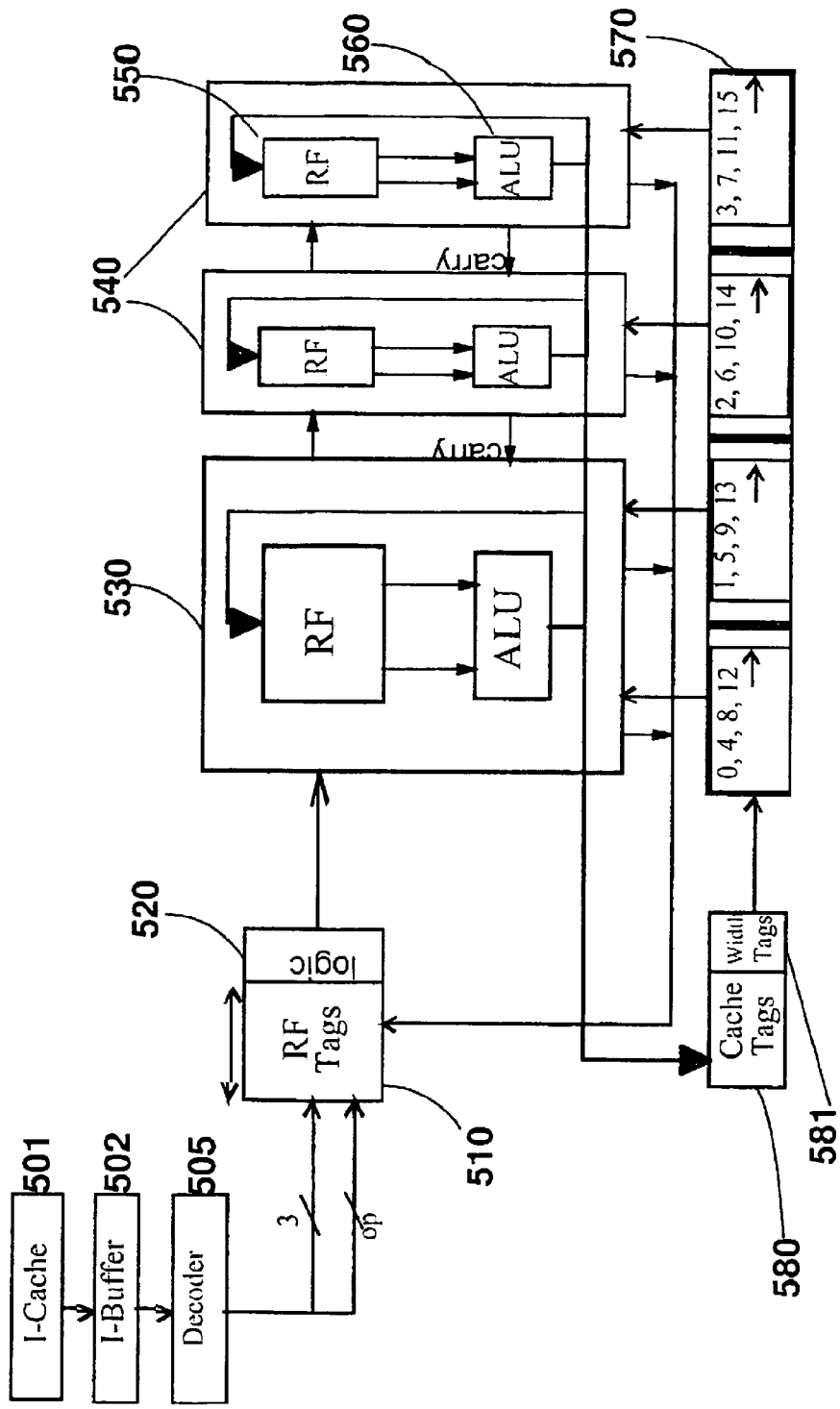
FIG. 5 illustrates another embodiment of the subject invention having a varying bit width architecture, and shows a pipeline microprocessor structure consisting of 3 slices, where 2 slices are of width 8-bits and 1 slice is of width 16-bits.
Figure 7:
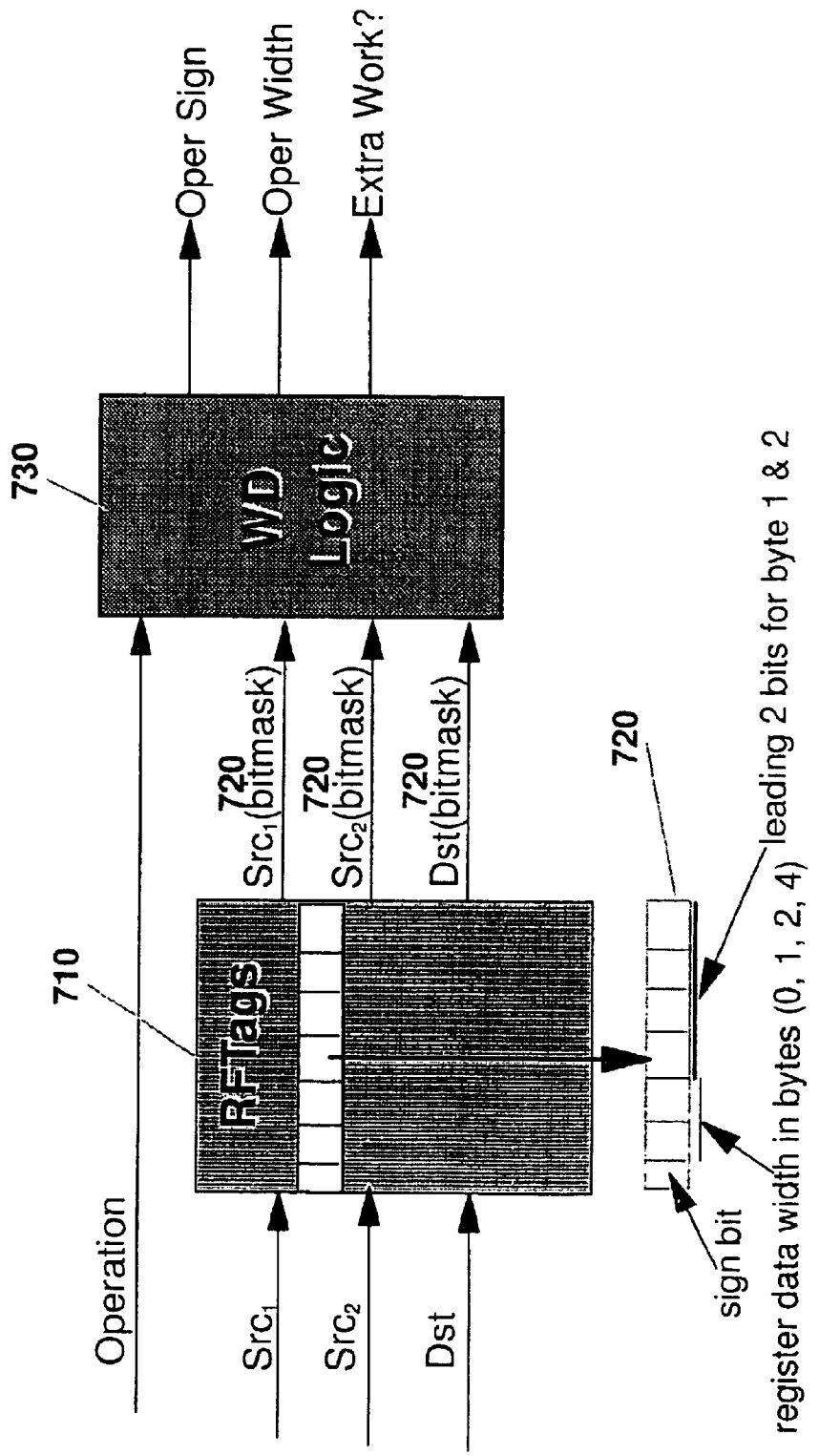
FIG. 7 illustrates a width determination process for operands comprising source operands $Src_1$ and $Src_2$ and a result register Dst.

To help in the effective operation width determination process, the RF Tags module 210, 510, 710, shown in FIGS. 2, 5 and 7, stores the sign and width of each operand stored in the Register File. In addition, these tags also keep track of a few (one or two, for example) leading bits of every byte of each RF value. These leading bits are particularly important for deciding the operation length. In particular, the leading bits for the two input operands to an operation can be examined for "possible overflow" detection. The actual number of bits can be arrived at based on a tradeoff between overflow detection accuracy and the number of bits the designer is willing to store. As explained below, the sign of a register value can either be stored in the RFtags module 210 or as part of the register value itself.

The RFtags module is accessed after an instruction is decoded; the contents of the RFtags module and the instruction opcode are used to determine the number of slices required for executing the corresponding instruction, and those slices are enabled in subsequent cycles, in pipelined fashion. In particular, for the case of narrow operations whose result is saved in a register which already contains a narrow operand, it is possible to save only the significant part without accessing the upper portion of the register if its contents are already set to the target value (for example, all zeroes).

The approach for a-priori width determination also requires a determination of the action needed to generate the upper portion of the result. Specifically, the following needs to be determined prior to executing a narrow operation: the width of the operands; the possibility of arithmetic overflow in the narrow operation; and the upper portion of the complete result.

An analysis on the present invention has revealed that the frequency of arithmetic overflow in narrow operations is quite small, so that the design of a processor can be optimized for the case when no overflow occurs. For these purposes, a mechanism is applied that determines the likelihood of an arithmetic overflow being generated from a narrow operation by examining the leading bit(s) of the operands involved, which are available in the RFtags. This mechanism generates three cases.

Case 1: No overflow is guaranteed, thus the effective operation width is determined by the width of the narrow operands.

Case 2: Overflow is guaranteed, thus the effective operation width must be one byte larger than the width of the narrow operands. As a result, no overflow is guaranteed.

Case 3: Overflow condition is possible but not certain, corresponding to the case wherein a carry into the bits examined will be propagated as a carry out. This situation can be handled by either regarding the possible overflow as "always overflow" or "no overflow." If "always overflow," then extra activity occurs for those cases when there is no actual overflow, whereas "no overflow" requires a mechanism that detects whether an overflow actually occurred and then re-executes the operation with one extra byte of width. The case 3 approach has the potential of leading to less activity, but at the cost of some complexity and performance degradation.

To determine the upper portion of the result, it is assumed that narrow operations are known a-priori not to generate arithmetic overflow, and rely on either of the schemes outlined above to deal with the cases when overflow may occur. For simplicity, the discussion is focused on the requirements for the implementation of addition. The determination of the upper portion of the complete result depends on the mechanism used to deal with the values contained in the narrow operands. Generally, there are 3 possible scenarios to arrive at a result for an operation: simple, simple with sign extension (1-biased), and quasi-simple.

simple: operands equal width, both positive; upper portion of the complete result full or all 0s.

simple with sign-extension (1-biased): operands can be the same or varying widths, at least one operand negative; the upper portion of the result is the sign extension of the computation.

quasi-simple: one operand narrow and one operand wide, both positive; the upper portion of the complete result is a copy of the upper portion of the wide operand.

FIG. 5 illustrates a second embodiment of the present invention having a cache tags 580 and width tags 581 similar to 280 and 281 as explained with reference to FIG. 2, and also having a varying bit width architecture, and shows a pipeline microprocessor structure consisting of 3 slices, where 2 slices 540 are of width 8-bits and 1 slice 530 is of width 16-bits. The embodiment here illustrates that an implementation can be of varying number of slices where the slices can be of varying bit widths as well. Again, each slice consists of a portion of the register file RF 550, the ALU 560, and a portion of the cache memory 570.

The concatenation of these 3 slices creates a full-width processor, as required by the processor architecture. The slices work either all in parallel when a full-width operation is executed, or only the lowermost slice(s) is(are) enabled if the operation width is determined to be narrow. Slices are enabled on a cycle-by-cycle basis by the width detection (WD) logic 520 which uses information about the width of the operands kept in the RFtags module 510. This embodiment can perform a 1 byte (8-bit), 2 byte (16 bits) or 4 byte (32 bits) computation per enablement, and the explanation focuses on ALU operations, with special emphasis on addition.

To start an instruction execution, the instruction is first fetched from the instruction cache 501 and loaded into the instruction buffer 502. The instruction is then decoded by decoder 505 for the operation and the targeted input and output registers. At this point, a varying bit processing methodology takes over as illustrated in the logic flow diagram of FIG. 6 and the supporting explanations of FIGS. 7–13. The RFtags module (210, 510, 710) is a table that stores value bit information (see stored value 720 in FIG. 7) about all operands in register files. This value bit information is referred to as bitmask 720. All sorts of value bit information may be kept for a register operand. In this implementation shown at the bottom of FIG. 7, the bitmask has one bit on the sign, two bits on the register data width in bytes of the operand value, and four bits on the two leading (most significant) bits of each of the first two bytes of the register operand.

In determining and storing the width of an operand into the RFtags module, a negative number is terminated by its first 1 bit in the MSB (most significant bit) portion that forms part of it being negative, i.e. beyond its terminating 0. A positive number on the other hand terminates by its most significant 1.

Figure 6:
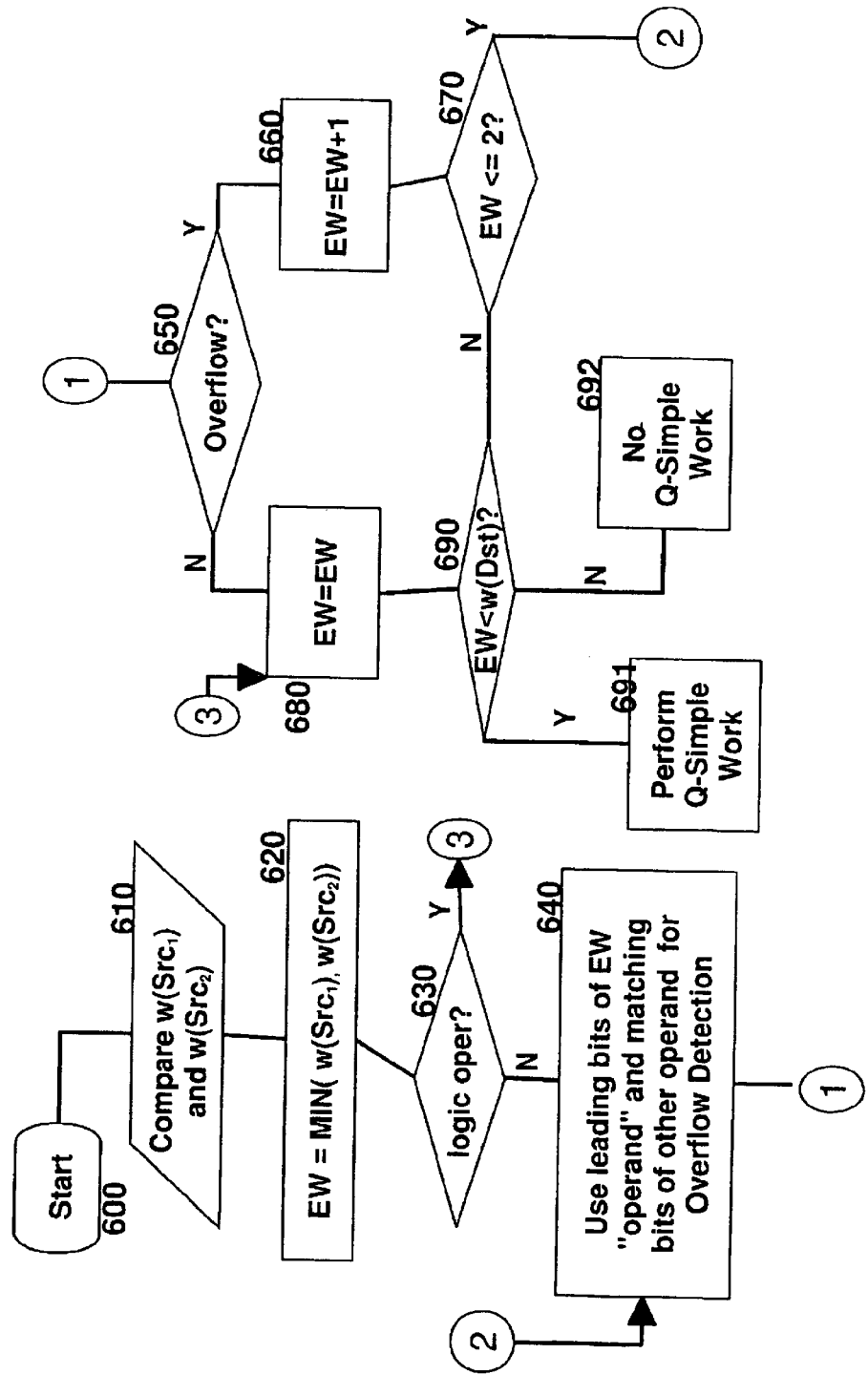
FIG. 6 is a logic flow diagram of width determination for operations of the ALU (arithmetic logical unit).

FIG. 6 is a logic flow diagram of width determination WD for operations of the ALU (arithmetic logical unit).

FIG. 7 illustrates a width determination WD process for operands comprising source operands $Src_1$ and $Src_2$ and a result register Dst, as determined by the RFtags module 710 and WD logic 730.

Figure 8:
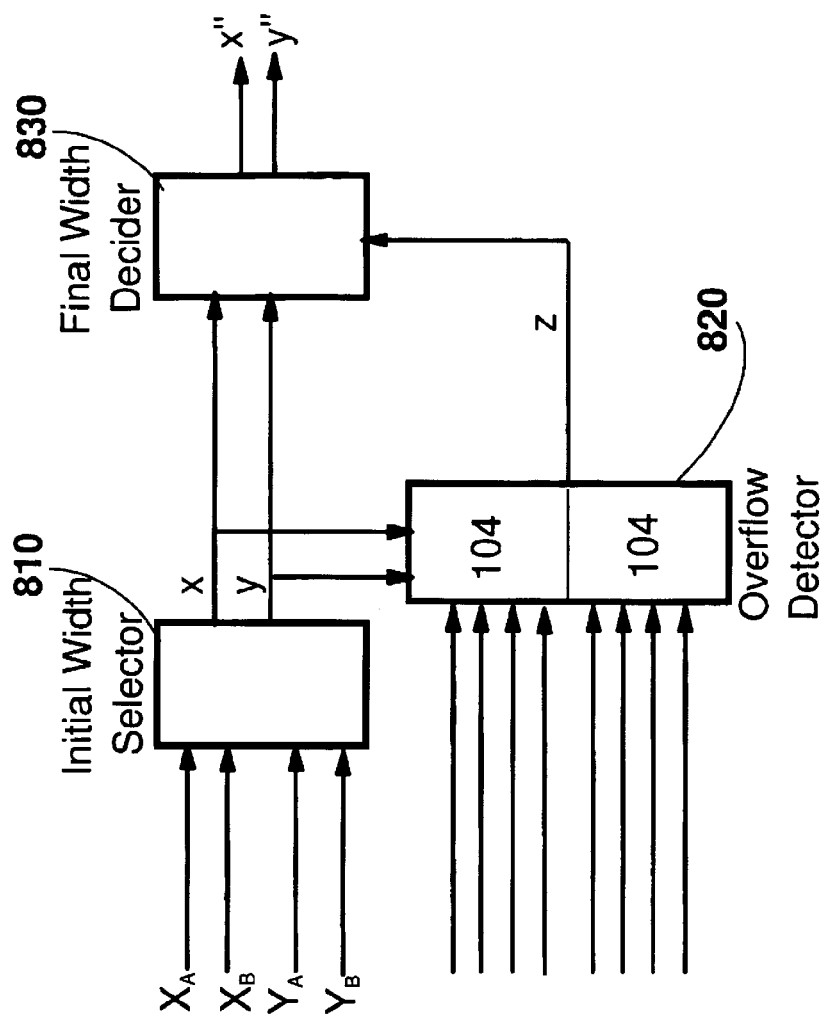
FIG. 8 illustrates WD (width determination) logic expanded to show overflow detection.

Referring to FIGS. 6, 7 and 8, a lookup of the REtags table is performed for the 2 source operands Src1, Src2 and the result register Dst, as shown at 710 in FIG. 7. Considering the operation of the instruction, the bitmask information about the value widths of the 2 source operands (Src1, Src2) are compared at 610, FIG. 6, and in the WD logic, as shown at 730, FIG. 7. Referring to FIG. 6 following start 600, the widths Src1 and Src2 are compared at 610, and, the narrower width of Src1 and Src2 is selected as the interim EW (effective operation width) at 620. Then the kind of operation is checked at 630. If the operation is a logic operation at 630, then the interim EW is the final EW at 680. This is because a logic operation, such as an AND or OR operation, by its very nature, does not result in an overflow. Whereas, if the operation is an arithmetic operation, such as an addition, then there is the possibility that an overflow can occur. In that case the next step is to check for an overflow at 640 and 650, FIG. 6, and at 820, FIG. 8.

The leading 2 bits of the narrower operand are compared against the matching bits of the other operand at 640. In the case where both operands are of the same width, the leading 2 bits of both operands are compared against each other. If it is determined that overflow is not possible, then the interim EW is the final EW at 680. However, if there is an overflow, then EW is EW+1 at 660. In the case where EW is 2 (for a 16 bit computation), for the embodiment of FIG. 5, this addition should take EW to a 4 (for a 32 bit computation) since the implementation of FIG. 5 skips a 24-bit computation). The new EW is checked to determine if it is less than or equal to 2 (i.e. 2 bytes) at 670. If the new EW turns out to be less than or equal to 2, then return to 640, where the leading 2 bits of the EW "operand" is again compared against the matching 2 bits of the other operand for possible overflow at 650. However, if the EW is larger than 2 at 670, then the final EW is the new EW. The final EW is next compared against the width of the result register Dst at 690. If EW is less than the width of Dst at 690, then quasi-simple work is performed at 691 to fill or reset the upper portion of Dst. No quasi-simple work otherwise, as indicated at 692.

Figure 9:
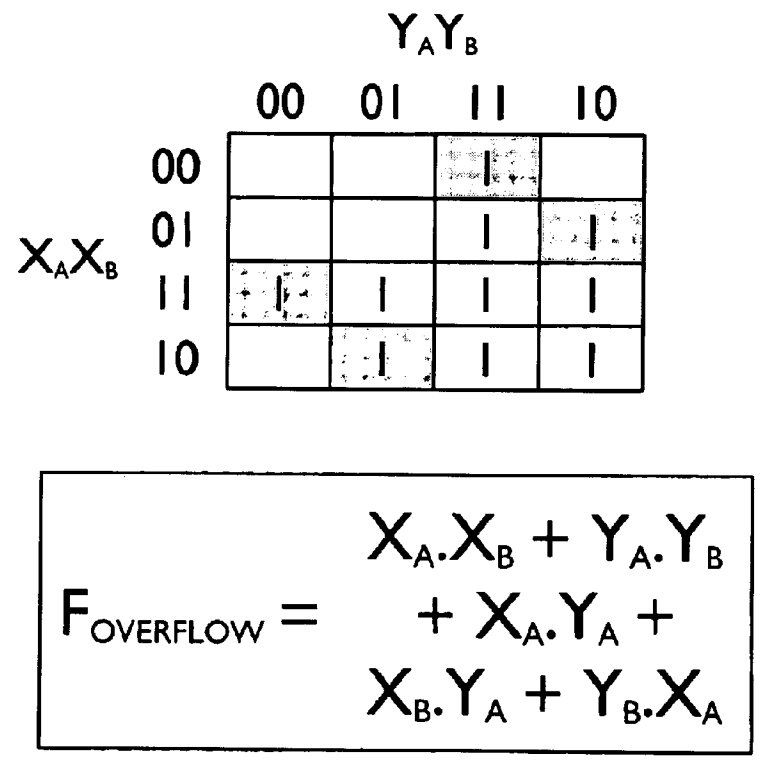

FIG. 9 illustrates a truth table for logic development for width determination WD in addition operations using 2-bit tags, wherein bit tag $X_A X_B$ are the two most significant (leading) bits of the WD operand (as stored in bitmask 720), and can assume one of the four values shown at the left side of the table at the top of FIG. 9. Similarly, $Y_A Y_B$ are the two most significant matching bits of the second operand (as stored in bitmask 720), and can assume one of the four values shown at the top of the table. The blank white blocks in the table indicate that there can be no overflow for the $X_AX_B$ and $Y_AY_B$ bit patterns intersecting at those boxes, the white blocks with a 1 therein indicate that there definitely will be an overflow, and the shaded blocks of the table indicate that there is a possibility of an overflow.

It should be noted that a 2-bit tag choice for overflow determination here is almost arbitrary, and an appropriate choice may be made after weighing the tradeoff between logic complexity and overflow determination accuracy based on the length of the bits tag considered. For example, for a 1-bit tag, there is less logic complexity and higher overflow mispredictions. In such a case, the whole system can be designed around poor overflow mispredictions such that an operation may be re-executed with a wider bit-width after an actual overflow occurs. The consequence in that case will be performance degradation. The other extreme is to examine and compare all the bits in both source operands. In such a case, overflow prediction accuracy will be perfect, however, the logic complexity involved may render the whole varying bit-width approach useless.

An overflow for an addition operation can be determined by the logic equation $F_{OVERFLOW}$ at the bottom of FIG. 9 which has five terms separated by a plus (+), which indicates that the five terms are logically ORed. Each of the five terms contains a period (.), which indicates that the two bits of the term are logically ANDed.

Figure 10:
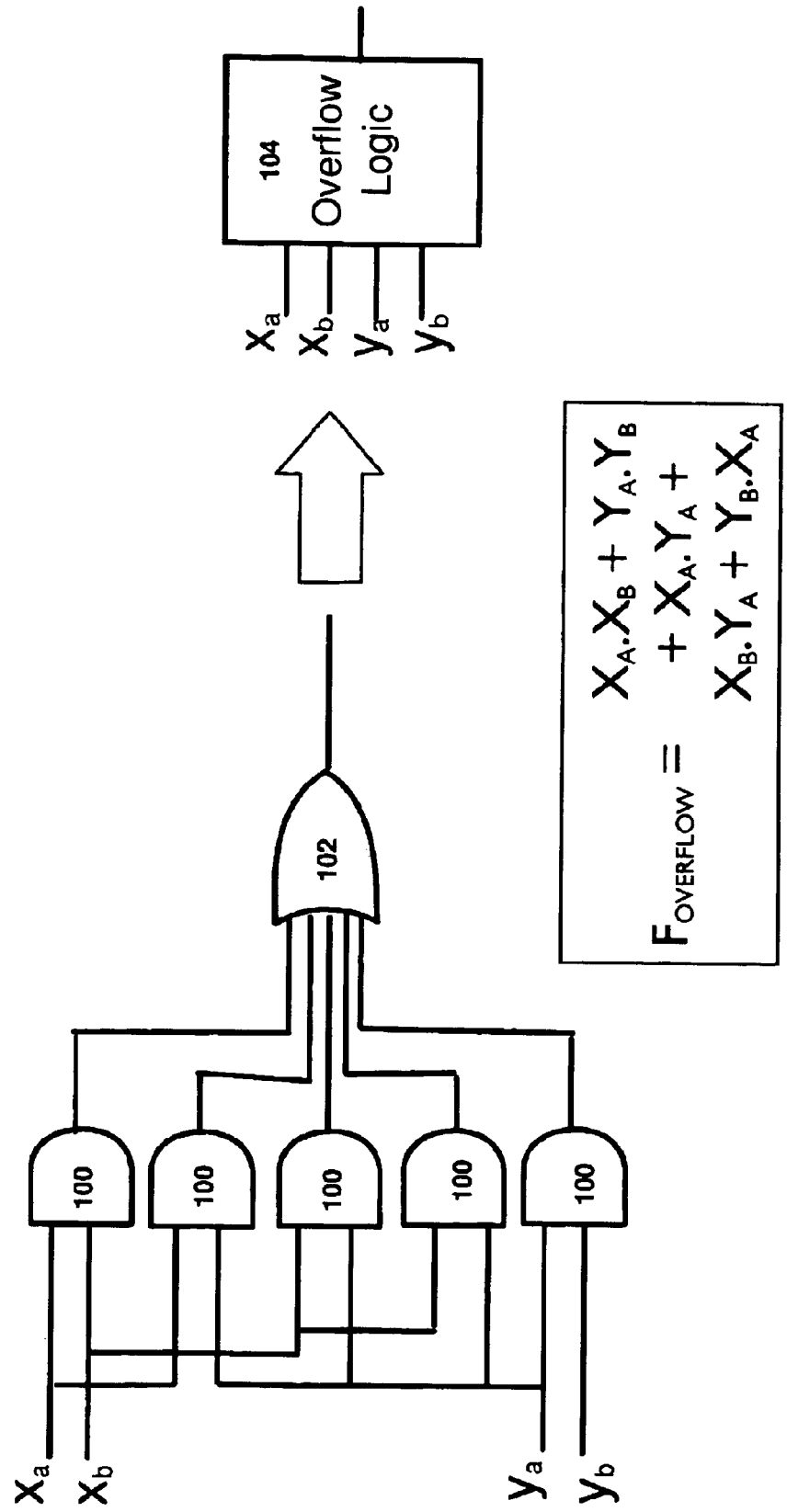
FIG. 10 illustrates one embodiment of a 2-bit overflow logic determination.

Accordingly, the equation $F_{OVERFLOW}$ can be implemented by the logic circuit of FIG. 10 which comprises 5 AND gates 100 having the illustrated inputs from $X_A$, $X_B$, $Y_A$, $Y_B$ to form the five terms of the equation $F_{OVERFLOW}$, the outputs of which are ORed by OR gate 102 to form the overflow logic circuit 104, which determines $F_{OVERFLOW}$.

FIG. 8 indicates the WED determination expanded to show overflow detection. The widths of operands 1 and 2 are input to an Initial Width Selector 810 corresponding to blocks 610,620 of FIG. 6, which outputs a 2 bit signal xy. If xy is 01, the initial operation width is 8 bits (1 byte) long. If xy is 10, the operation width is 16 bits (2 bytes) long. Otherwise, that is for xy being 00 or 11, the operation width is 0 bits or the full 32 bits, respectively. An Overflow Detector 820, discussed further in FIG. 11, outputs an overflow signal z to a Final Width Decider 830 which modifies the initial selection xy to the final width determination x"y" based on the output z of the Overflow Detector 820.

Figure 11:
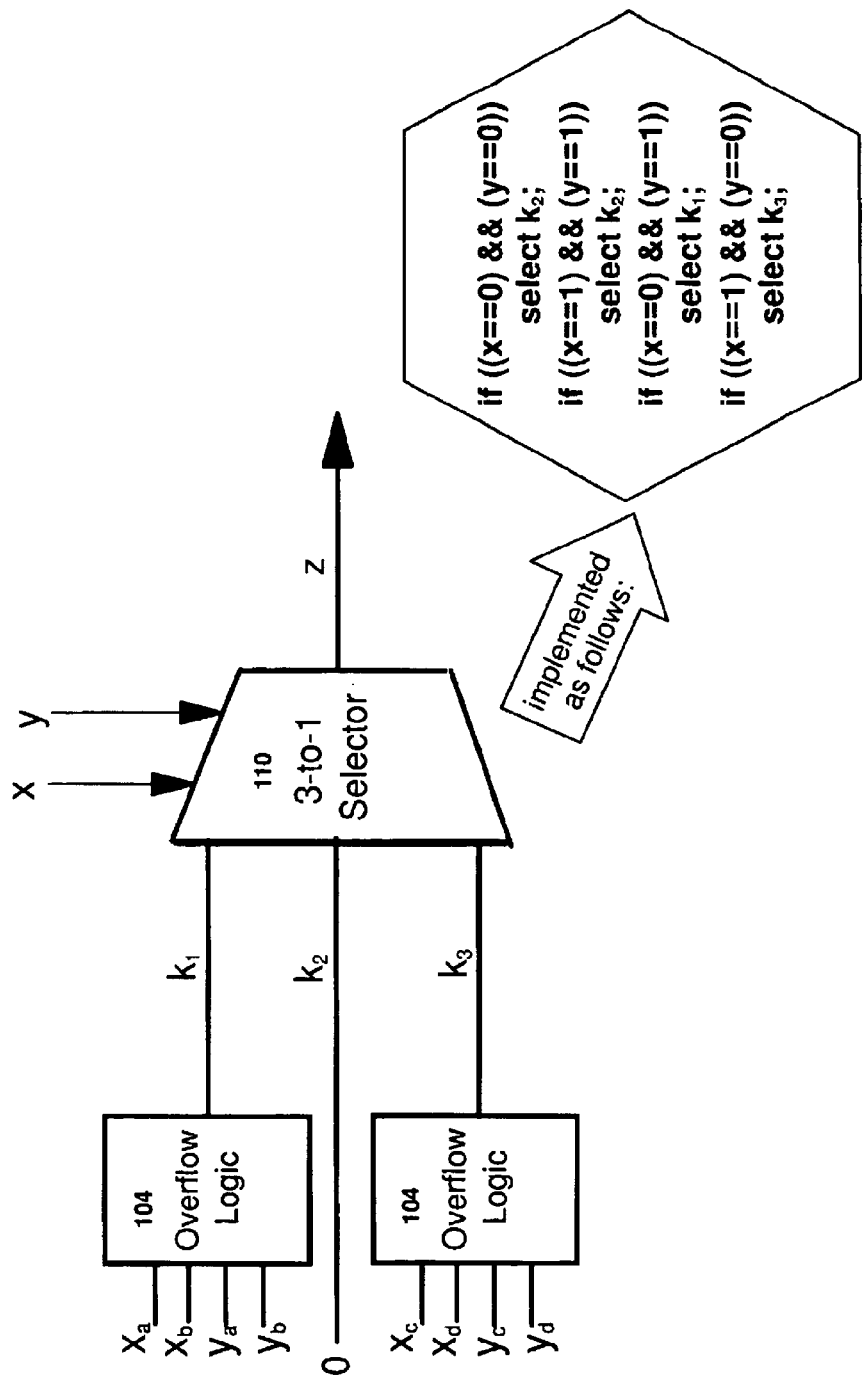
FIG. 11 illustrates one embodiment for performing overflow determination in parallel across two widths.

FIG. 11 describes an expanded form of Overflow Detector 820. In this overflow detector designed to specifically fit the embodiment of the invention presented in FIG. 5, two Overflow Logic Circuits 104 are placed in parallel to catch possible overflows flowing past the 8 bits boundary or the 16 bits boundary. As shown, the corresponding two most significant bits of the two operands for the 8 bit boundary ($X_AX_B$, $Y_AY_B$) feed into one Overflow Logic Circuit 104 whose output is $k_1$. Likewise, the two most significant bits of the two operands for the 16 bit boundary (labeled $X_CX_D$, $Y_CY_D$) feed into another Overflow Logic Circuit 104 whose output is $k_3$. A third signal $k_2$ is tied to 0. All three signals $k_1$, $k_2$, $k_3$ feed into a 3-to-1 Selector 110, which selects among them based upon the output xy of the Initial Width Selector 810, and outputs a final value z to the Final Width Decider 820, as illustrated in FIG. 8. This logic provides a simple and efficient way of covering overflows in the embodiment shown in FIG. 5, which has both an 8 bit wide slice and a 16 bit wide slice.

Following the WD width determination stage, control signals flow from the WD logic 220 or 520 directly to enable dataflow and computation in the slices 230, FIG. 2, or 530, 540, FIG. 5, appropriately. The actual slices enabled per each cycle depends on the "width of the operation" determined. Enabling and disabling is accomplished by the use of clock gating, where enabling means that clock signals allow data to proceed into and through a slice. Likewise, disabling implies that clock signals block the flow of data into and through a slice.

Figure 12:
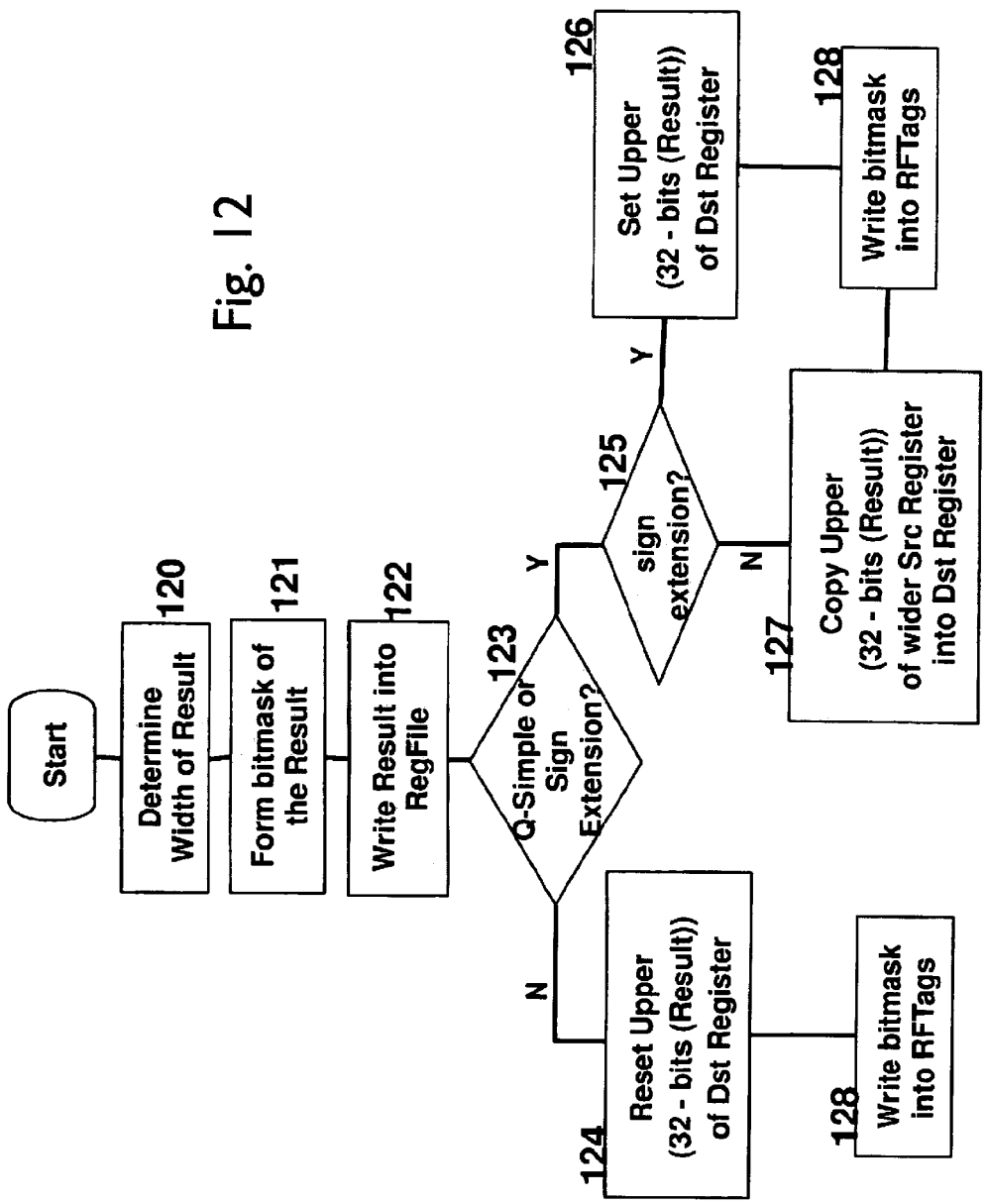
FIG. 12 is a logic flow of data writeback following ALU operation execution and completion.

FIG. 12 is a logic flow diagram showing the flow of data following execution and completion of an ALU operation. This follows right after a set of slice(s) are enabled and the actual ALU computation is complete. At this stage, at 120 the width of the actual value of the Result is determined. The value width determination of the Result is further explained in FIG. 13. After determining the width of the Result, at 121 a 7-bit bitmask 720 is formed for the Result by combining its sign bit, value width and the leading 2 bits for its byte one and byte two. At 122 the actual value of the Result is then written to the destination register Dst in the register file RF 250,550. At 123 the signal from the WD stage for Q-Simple Work is examined for quasi-simple work or sign extension work.

If the Q-Simple Work signals are negative 123, at 124 the upper portion of the destination register Dst beyond the width of Result is reset, and at 128 the formed bitmask 720 is written into the corresponding entry in RFTags (210,510, 710).

On the other hand, if the Q-Simple Work signals are positive at 123, at 125 a further check is made for a sign extension. If the sign extension is true, at 126 the upper portion of the destination register Dst beyond the width of Result is set, and at 128 the formed bitmask 720 is written into the corresponding entry in RFTags (210,510,710). If the sign extension is false at 125, at 127 the upper portion of the wider source register Src beyond the width of Result is copied into the upper portion of the destination register Dst 127, and at 128 the formed bitmask 720 is written into the corresponding entry in RFTags (210,510,710).

Figure 13:
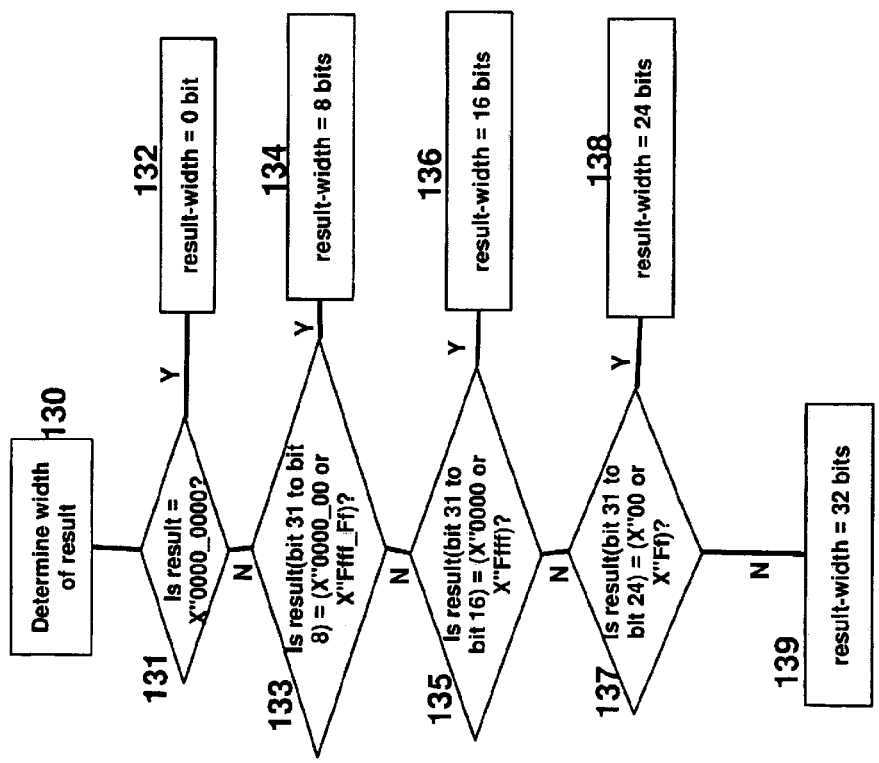
FIG. 13 illustrates one embodiment for determining the width of a result value.

FIG. 13 is a logic flow diagram that illustrates, following a determination of the width of an operand or a result value at 130, a comparison at 131 determines if the result =X"0000 0000, and if yes, then at 132, the result-width=0 bit. A comparison at 133 determines if the result (bit 31 to bit 8 )=(X"0000 00 or X"Ffff Ff), and if yes, then at 134 the result-width =8 bits. A comparison at 135 determines if the result (bit 31 to bit 16 )=(X"0000 or X"Ffff), and if yes, then at 136 the result-width=16 bits. A comparison at 137 determines if the result (bit 31 to bit 24 ) =(X"00 or X"Ff), and if yes, then at 138 the result-width=24 bits, and if not then at 139 the result-width=32 bits. This illustration is shown for up to 32-bit wide values. Even though the comparisons 131, 133, 135, and 137 are illustrated serially in FIG. 13, they can also be carried out in parallel.

While several embodiments and variations of the present invention for a method and apparatus for reducing logic activity in a microprocessor are described in detail herein, it should be apparent that the disclosure and teachings of the present invention will suggest many alternative designs to those skilled in the art.

Having thus described our invention, what we claim as new, and desire to secure by Letters Patent is:

1. A multistage microprocessor pipeline structure for executing instructions comprising: an instruction cache, a decoder, a register file, an arithmetic logic unit, and a cache memory, said register file, arithmetic logic unit (ALU) and cache memory organized as a plurality of slices adapted to be enabled selectively depending on a width of instruction operands and operation results, each slice comprising a reduced bit width portion of said register file, a reduced bit width portion of said arithmetic logic unit, and a reduced bit width portion of the cache memory, wherein all of said slices are enabled to operate in parallel when a full bit width processing operation is executed, or, only a minimum required number of slices are enabled to operate if an operation is determined to be narrower than full bit width, one or more said slices being enabled for operation on a cycle-by-cycle basis during the execution of instructions, whereby instructions from said instruction cache and decoded for operation by the decoder, and registers used in the operation are detected and register contents are input to the arithmetic logic unit which executes the instruction, said microprocessor pipeline structure further comprising:

a register value information means for receiving from said decoder an identity of registers used in the operation, and outputting information about values included in those registers; and, a width determination means for receiving outputs from said decoder and said register value information means, and generating one or more width control signals used to enable said one or more slices required for execution of the operation, wherein only those slices enabled access simultaneously corresponding portions of said register file whose contents are needed for execution of the operation; said contents being input in parallel to the portions of the arithmetic logic unit which execute the operation, and said ALU results generated are written in parallel to said portions of said register file selected to receive those results.

2. The multistage microprocessor pipeline structure of claim 1, wherein the width determination means uses data about the length of operands stored in said resister value information means that stores value bit information about each operand in the register file, including the sign and width of each operand, and one or more leading bits of one or more bytes of each operand, which are used to determine the number and which slices to enable for execution.

3. The multistage microprocessor pipeline structure of claim 2, wherein the value bit information includes a sign of an operand in one bit, a register data width in bytes of the operand value in two bits, and one or more leading bits of one or more of the most significant bytes of the operand.

4. The multistage microprocessor pipeline structure of claim 2, wherein the output of the decoder indicates two source registers and one destination register, and an instruction operation code, said register value information means and the instruction operation code are used to determine the number of slices required for executing the corresponding processing instruction, and those number of slices are enabled in subsequent cycles in the pipeline structure.

5. The multistage microprocessor pipeline structure of claim 1, wherein a cache tag file stores addresses of the cache memory to write to and read from, and a width tag file stores the width of data stored in each memory address.

6. The multistage microprocessor pipeline structure of claim 1, wherein the width determination means outputs the width control bits to enable data flow and computation in the slices.

7. The multistage microprocessor pipeline structure of claim 1, wherein enabling and disabling of each slice is accomplished by clock gating, where during enabling, clock signals allow data to proceed into and through a slice, and during disabling, clock signals block the flow of data into and through a slice.

8. The multistage microprocessor pipeline structure of claim 2, wherein the width determination means determines the likelihood of a data overflow being generated from a narrow slice operation by examining one or more leading bits of the operands which are stored in said register value information means and generates one of three determinations;

no data overflow is guaranteed, and the effective operation width is determined by the width of the narrow operands;

data overflow is guaranteed, and the effective operation width must be one byte larger than the width of the narrow operands;

data overflow is possible but not certain, wherein a carry into the bits examined is propagated as a carry out.

9. The multistage microprocessor pipeline structure of claim 1, wherein following execution and completion of a processing operation by the arithmetic logic unit, the width of the value of the processed operation result is determined by the width determination means, after which a register information value for the processing operation result is formed by combining its sign bit, value width and one or more leading bits for its one or more leading bytes, said register information value being written to said register value information means and said operation result is written to a destination register in the register file.

10. A method for reducing logic activity in the execution of an operation in a processor comprising the steps of:

selecting at least one operand associated with said operation, looking up a width and a value of selected bits of said at least one operand, determining a prediction of arithmetic overflow, based upon the width and the value of said selected bits of said at least one operand, determining an effective width of said operation based upon the width of said at least one operand, a function specified by said operation, and said prediction of arithmetic overflow, enabling the width of the resources in said processor corresponding to said effective width of said operation for executing said operation, executing said operation over the enabled width of the resources, determining the width of the result of said operation based upon the step of executing.

11. The method of claim 10, including saving the width of the result of said operation, and saving said result of said operation.

12. The method of claim 10, wherein said step of looking up a width and a value of selected bits includes dedicated hardware for holding and retrieving said width and said value of selected bits.

13. The method of claim 10, wherein the processor includes a register file, an arithmetic unit, a memory path, and a cache memory, and the register file, the arithmetic unit, and the cache memory are divided into a plurality of slices, each of which is of a reduced bit granularity, and the bits in all of the slice form a full width word in the processor.

14. The method of claim 13, wherein at least one slice is of 8 bit granularity.

15. The method of claim 13, wherein at least one slice is of 16 bit granularity.

16. The method of claim 13, wherein said step of enabling includes logic to enable a required number of slices to execute the operation.

17. A processor comprising:
- a plurality of slices, each of which is a portion of a full width word of the processor, wherein each slice comprises a portion of a register file, a portion of functional units, a portion of a memory path, a portion of a cache memory, and a portion of other resources required to perform operations in the processor,
- logic to save and retrieve a width and selected bits of operands used to perform an operation in the processor,
- logic to determine a prediction of arithmetic overflow when performing the operation, based upon the width and the selected bits of the operands used to perform the operation,
- logic to determine a number of slices required to perform the operation based upon the width of one or more operands, the functionality of the operation, and the prediction of arithmetic overflow, and,
- logic to activate the determined number of slices required to perform the operation.

18. The processor of claim 17, including logic to determine the width of the result of the operation,
- circuitry to store said width and selected bits of said result, and circuitry to store said result.

19. The multistage microprocessor pipeline structure as claimed in claim 1, wherein if an operation accesses said cache memory, only those portions of the cache memory that participate in the operation are accessed in parallel.

20. The multistage microprocessor pipeline structure as claimed in claim 19, wherein a data carry operation proceeds from a lesser significant slice to a more significant slice.

* * * * *

UNITED STATES PATENT AND TRADEMARK OFFICE
CERTIFICATE OF CORRECTION

PATENT NO. : 6,948,051 B2
DATED : September 20, 2005
INVENTOR(S) : Vinodh R. Cuppu et al.

It is certified that error appears in the above-identified patent and that said Letters Patent is hereby corrected as shown below:

Column 6,
Line 18, "Missing ¶" should read -- Figure 8 illustrates the width determination WD logic expanded to show overflow detection, as explained in greater detail hereinbelow --.
Line 18, "lookup of the Retags" should read -- lookup of the RFtags --.

Column 7,
Line 33, "indicates the WED" should read -- indicates the WD --.

Column 8,
Lines 41-42, "=X"00000000" should read -- X"0000_0000 --.
Line 44, "(X"0000 00" should read -- (X"0000_00 --.
Line 44, "X"Ffff Ff" should read -- X"Ffff_Ff --.

Column 10,
Line 8, "determinations;" should read -- determinations: --.

Signed and Sealed this

Seventh Day of February, 2006

JON W. DUDAS
*Director of the United States Patent and Trademark Office*